United States Patent
Schlitzkus et al.

(10) Patent No.: US 9,046,436 B2
(45) Date of Patent: Jun. 2, 2015

(54) SENSOR UNIT

(71) Applicant: Robert Bosch GmbH, Stuttgart (DE)

(72) Inventors: Michael Schlitzkus, Dietmannsried (DE); Stefan Lehenberger, Weitnau (DE); Robert Hengler, Durach (DE); Dmitriy Aranovich, Sonthofen (DE); Philip Martin Lenk, Burgberg (DE); Peter Diesel, Bad Hindelang (DE); Christian Pfleger, Reutlingen (DE)

(73) Assignee: Robert Bosch GmbH, Stuttgart, DE (US)

( * ) Notice: Subject to any disclaimer, the term of this patent is extended or adjusted under 35 U.S.C. 154(b) by 212 days.

(21) Appl. No.: 13/849,684

(22) Filed: Mar. 25, 2013

(65) Prior Publication Data

US 2013/0255391 A1    Oct. 3, 2013

(30) Foreign Application Priority Data

Mar. 27, 2012  (DE) .......................... 10 2012 204 904

(51) Int. Cl.
*G01L 7/00* (2006.01)
*G01L 9/00* (2006.01)
*G01L 19/14* (2006.01)
*B60T 8/36* (2006.01)

(52) U.S. Cl.
CPC ............. *G01L 19/148* (2013.01); *G01L 19/147* (2013.01); *B60T 8/3675* (2013.01)

(58) Field of Classification Search
CPC ...... G01L 19/147; G01L 19/14; G01L 19/148
USPC ............................................. 73/756, 753, 700
See application file for complete search history.

(56) References Cited

U.S. PATENT DOCUMENTS

| | | | |
|---|---|---|---|
| 5,629,486 A * | 5/1997 | Viduya et al. .................... 73/727 |
| 5,802,912 A * | 9/1998 | Pitzer et al. ...................... 73/756 |
| 8,104,357 B2 * | 1/2012 | Schlitzkus et al. ............... 73/756 |
| 8,671,767 B2 * | 3/2014 | Kaiser et al. ..................... 73/756 |
| 2010/0192696 A1 * | 8/2010 | Schlitzkus et al. ............... 73/756 |
| 2012/0067130 A1 * | 3/2012 | Kaiser et al. ..................... 73/756 |

FOREIGN PATENT DOCUMENTS

WO      2009/007286 A2    1/2009

* cited by examiner

*Primary Examiner* — Lisa Caputo
*Assistant Examiner* — Jonathan Dunlap
(74) *Attorney, Agent, or Firm* — Maginot, Moore & Beck LLP

(57) ABSTRACT

A sensor unit has at least one measuring cell and a circuit mount arranged in a protective sleeve. The measuring cell detects a pressure of a hydraulic block. The circuit mount has a printed circuit board, which is positioned perpendicularly relative to the measuring cell. The printed circuit board has an electronic circuit with at least one electronic and/or electrical component. The measuring cell has at least one connection point configured to tap off at least one electrical output signal from the measuring cell. The circuit mount forms an internal interface which taps off the at least one electrical output signal from the measuring cell and applies it to the electronic circuit. An output signal from the electronic circuit can be tapped off by an external interface. The internal interface is formed at a first end and the external interface is formed at a second end of the protective sleeve.

10 Claims, 7 Drawing Sheets

SENSOR UNIT

This application claims priority under 35 U.S.C. §119 to patent application no. DE 10 2012 204 904.5, filed on Mar. 27, 2012 in Germany, the disclosure of which is incorporated herein by reference in its entirety.

BACKGROUND

The disclosure is based on a sensor unit according to the description below.

WO 2009/007286 A2 discloses, for example, a connection unit for a pressure measuring cell. The known connection unit comprises a protective sleeve in which at least one measuring cell, which detects, in particular, a pressure of a hydraulic block, and a circuit mount having a printed circuit board, which is positioned in a perpendicular manner, are arranged, the said printed circuit board comprising an electronic circuit with at least one electronic and/or electrical component. The circuit mount has a lower cylindrical region and an upper cylindrical region, the said cylindrical regions being connected to one another by means of a rectangular central section, wherein the printed circuit board, which is positioned in a perpendicular manner, is arranged parallel to the rectangular central section between the two cylindrical sections of the circuit mount. The pressure measuring cell has at least one connection point by means of which at least one electrical output signal from the pressure measuring cell can be tapped off. The circuit mount has an internal interface which taps off the at least one electrical output signal from the pressure measuring cell and applies it to the electronic circuit, and has an external interface by means of which an output signal from the electronic circuit can be tapped off. In this case, the internal interface is formed at a first end of the protective sleeve, and the external interface is formed at a second end of the protective sleeve. Furthermore, the circuit mount has at least one external conductor track for the electronic circuit to make contact with the connection point. In addition, at least one contact means is provided, it being possible to tap off an output signal from the electronic circuit by means of the said contact means, wherein the electronic circuit is connected to the contact means by means of at least one external conductor track of the circuit mount. Contact is made between the pressure measuring cell and the circuit mount or the circuit mount and the printed circuit board or the electronic components by means of corresponding conductive adhesive connections. In order to establish these conductive adhesive connections, the circuit mount has conductive adhesive domes and the pressure measuring cell or the printed circuit board or the electronic components have corresponding conductive adhesive areas. The circuit mount preferably comprises at least one plastic pre-molded part which is composed of plastic which can be electroplated and of a second plastic which cannot be electroplated, wherein the conductor tracks and the conductive adhesive domes are produced in an electroplating process as a metal surface coating on the electroplated plastic. In order for the connection unit to make direct releasable contact with an add-on controller, the corresponding contact means are preferably configured as contact rivets which are adhesively bonded into provided openings, which are connected to the conductor tracks, by means of conductive adhesive.

SUMMARY

According to the features described below, the sensor unit according to the disclosure has the advantage over the above that it can be constructed in a particularly compact manner since the circuit mount forms only the internal interface and is arranged at the first end of the protective sleeve. The printed circuit board is formed within the protective sleeve as a structural component at the same time and is joined to the circuit mount at the first end face. At the second end face, the printed circuit board is joined to a supporting unit which supports the printed circuit board against the protective sleeve. As a result, the overall height of the sensor unit can advantageously be reduced.

Embodiments of the sensor unit according to the disclosure have a modular configuration, with the result that a very wide variety of sensors and customer interfaces can advantageously be implemented. Furthermore, integrated shock protection can be provided by the protective sleeve in conjunction with the supporting unit and the circuit mount, this reducing the probability of malfunctioning during assembly or use. In addition, redundant contact-making options without effective external static contact-making force can advantageously be provided directly on the printed circuit board for the external interface.

The essence of the present disclosure is in an intelligent combination of different elements and functions, which were discrete up until now, in one component. Combined components of this kind have more degrees of freedom and can therefore be used in a more flexible manner. The use of a plurality of such combined components with multiple functions produces a sensor unit comprising a modular composite which comprises the circuit mount, which makes electrical contact with the measuring cell, the printed circuit board, which is positioned in a perpendicular manner and can preferably be populated on both sides and is inserted and/or adhesively bonded into the circuit mount, the supporting element, which is preferably mounted and/or adhesively bonded onto the printed circuit board which is positioned in a perpendicular manner, and the protective sleeve with a flange which supports the measuring cell. An electronic circuit is arranged on the printed circuit board, the said electronic circuit, for example, amplifying a signal and/or processing a raw signal from the measuring cell. In addition, when an application-specific integrated circuit (ASIC) is used, corresponding protective circuitry is provided on the printed circuit board. Guide means for guiding external contact means can be provided in the supporting element as an additional function, the said guide means forming the external interface with the second contact means of the printed circuit board.

Embodiments of the present disclosure provide a sensor unit which has a protective sleeve in which at least one measuring cell, which detects, in particular, a pressure of a hydraulic block, and a circuit mount having a printed circuit board, which is positioned in a substantially perpendicular manner and can preferably be populated on both sides and comprises an electronic circuit with at least one electronic and/or electrical component, are arranged. The measuring cell has at least one connection point by means of which at least one electrical output signal from the measuring cell can be tapped off. The circuit mount has an internal interface which taps off the at least one electrical output signal from the measuring cell and applies it to the electronic circuit. An output signal from the electronic circuit can be tapped off by means of an external interface. In this case, the internal interface is formed at a first end of the protective sleeve, and the external interface is formed at a second end of the protective sleeve. According to the disclosure, the printed circuit board, which is positioned in a substantially perpendicular manner, has a main mount which has a first joining geometry on a first end face, the said joining geometry being joined to an outer joining geometry on a main body of the circuit mount, wherein the main mount of the printed circuit board has a second joining geometry on a second end face, the said second joining geometry being joined to a joining geometry on a main body of a supporting unit which is arranged at the second end of the protective sleeve and which supports the printed circuit board against the protective sleeve.

Advantageous improvements to the sensor unit which is specified in the description below are possible by virtue of the measures and developments which are also cited in the description below.

It is particularly advantageous that the main body of the circuit mount can be configured as a cylinder having an internal joining geometry which is matched to an outer contour of the measuring cell and surrounds the measuring cell. The circuit mount preferably comprises at least one plastic pre-molded part which is composed of a first plastic which can be electroplated and of a second plastic which cannot be electroplated, wherein conductor tracks and contact means are applied by an electroplating process as a metal surface coating on the plastic which can be electroplated. As an alternative, the plastic pre-molded part can be produced from the second plastic which cannot be electroplated and be at least partially over-molded by the first plastic which can be electroplated. The circuit mount can be produced, for example, by means of MID-2K technology, that is to say the injection-molded circuit mount (Molded Interconnected Device) comprises two components which comprise a first plastic which can be electroplated and is at least partially over-molded by a second plastic which cannot be electroplated. As an alternative, the second plastic which cannot be electroplated can be at least partially over-molded by the first plastic which can be electroplated. The partially projecting surfaces of the pre-molded part are coated with a metal surface by an electroplating process, with the result that the external conductor tracks and contact means are produced. The use of an injection-molded MID circuit mount of this kind is particularly well-suited to the present application since the miniaturization of the connection unit for the sensor unit can be promoted on account of the improved configuration freedom and the integration of electrical and mechanical functions. The circuit mount can also be selectively produced by an MID which is directly patterned by means of a laser. In this case, the MID circuit mount comprises an injection-molded part in which the locations of the printed circuit boards and contact means are patterned with the aid of a laser and are then coated with a metal surface by an electroplating process. As an alternative, the circuit mount can also be produced as a stamped grid which is encapsulated with plastic by injection molding.

In an advantageous refinement of the sensor unit according to the disclosure, the outer joining geometry on the main body of the circuit mount can comprise two receiving pockets which can each comprise at least one first contact means for making electrical contact with the printed circuit board. The at least one first contact means can be connected to at least one second contact means for making electrical contact with the measuring cell, for example, by means of an external conductor track on the main body of the circuit mount.

In a further advantageous refinement of the sensor unit according to the disclosure, the first joining geometry of the printed circuit board can be configured as a cutout in the main mount, the said cutout being delimited on two opposite sides in each case by a guide limb, wherein the two guide limbs of the first joining geometry of the printed circuit board are each joined to a receiving pocket of the outer joining geometry of the circuit mount. In this case, the guide limbs can be guided by means of inner guide edges in the receiving pockets and/or by means of outer guide edges on an inner contour of the protective sleeve. The printed circuit board can, as required, have a prespecifiable small angle of inclination in relation to the perpendicular vertical axis of the sensor unit by virtue of corresponding shaping of the receiving pockets. The main mount of the printed circuit board, which is positioned in a substantially perpendicular manner, can have first contact means in the region of the first joining geometry, the said first contact means forming the internal electrical interface with corresponding first contact means in the region of the outer joining geometry on the main body of the circuit mount.

In a further advantageous refinement of the sensor unit according to the disclosure, the main mount of the printed circuit board, which is positioned in a substantially perpendicular manner, can have second contact means in the region of the second joining geometry, it being possible for corresponding external contact means to make contact with the said second contact means and the said second contact means forming the external electrical interface. The second contact means are preferably configured as redundant contact areas which are in each case arranged on an upper face and a lower face of the main mount of the printed circuit board. The external contact means can be configured, for example, as contact clips with two limbs which are pushed onto the second contact means, which are configured as redundant contact areas, such that a contact force acts perpendicular to the insertion direction of the main mount of the printed circuit board, with the result that the rest of the printed circuit board, in particular the internal interface, remains free of force. On account of the redundant configuration of the second contact means and the contact force which acts perpendicular to the insertion direction of the main support, even a non-ideal contact-connection which is caused, for example, by soiling does not yet lead to malfunctioning of the electrical and/or mechanical connection of the external interface. Since a greater contact force is also possible by virtue of the described contact geometry, it may be possible to dispense with expensive contact materials, for example gold.

In a further advantageous refinement of the sensor unit according to the disclosure, the supporting unit can have guide means for guiding the external contact means. As a result, the external interface can be matched to different customer requirements in a variable manner by means of the configuration of the supporting unit.

An exemplary embodiment of the disclosure is illustrated in the drawings and will be explained in greater detail in the following description. In the drawings, identical reference symbols designate components and elements which perform the same or analogous functions.

BRIEF DESCRIPTION OF THE DRAWINGS

FIG. 11 shows a schematic perspective illustration of the printed circuit board for the sensor unit according to the disclosure from FIG. 1 or 2 with external contact means pushed on.

FIG. 13 shows a schematic perspective illustration of an upper section of the sensor unit according to the disclosure from FIG. 1 or 2 with external contact means pushed on.

DETAILED DESCRIPTION

As shown in FIGS. 1 to 13, the illustrated exemplary embodiment of the sensor unit 1 according to the disclosure comprises a protective sleeve 20 in which at least one measuring cell 50, which detects, in particular, a hydraulic pressure of a solenoid-valve-controlled fluid in a vehicle brake system, and a circuit mount 60 with a printed circuit board 40, which is positioned in a substantially perpendicular manner, are arranged. The printed circuit board 40 is preferably configured such that it can be populated on both sides and comprises an electronic circuit 44 with at least one electronic and/or electrical component 44.1, 44.2 which, for example, amplifies signals and/or processes a raw signal from the measuring cell 50. In the illustrated exemplary embodiment, the electronics circuit 44 comprises an application-specific integrated circuit (ASIC) 44.1 and corresponding protective circuitry. The measuring cell 50 converts the hydraulic pressure into at least one electrical output signal and has at least one connection point 54 by means of which the at least one electrical output signal from the measuring cell 50 can be tapped off. The circuit mount 60 has an internal interface 26 which taps off the at least one electrical output signal from the measuring cell 50 and applies it to the electronic circuit 44. In addition, an output signal from the electronic circuit 44 can be tapped off by means of an external interface 28. In this case, the internal interface 26 is formed at a first end 20.1 of the protective sleeve 20, and the external interface 28 is formed at a second end 20.2 of the protective sleeve 20. The protective sleeve 20 protects the internals of the sensor unit 1 against excessive mechanical loading. According to the disclosure, the printed circuit board 40, which is positioned in a substantially perpendicular manner, comprises a main support 42 which has a first joining geometry 42.3 on a first end face, the said joining geometry being joined to an outer joining geometry 62.1 on a main body 62 of the circuit mount 60, and has a second joining geometry 42.1 on a second end face, the said second joining geometry being joined to a joining geometry 32.1 on a main body 32 of a supporting unit 30 which is arranged at the second end 20.2 of the protective sleeve 20 and which supports the printed circuit board 40 against the protective sleeve 20.

Figures 1, 2:
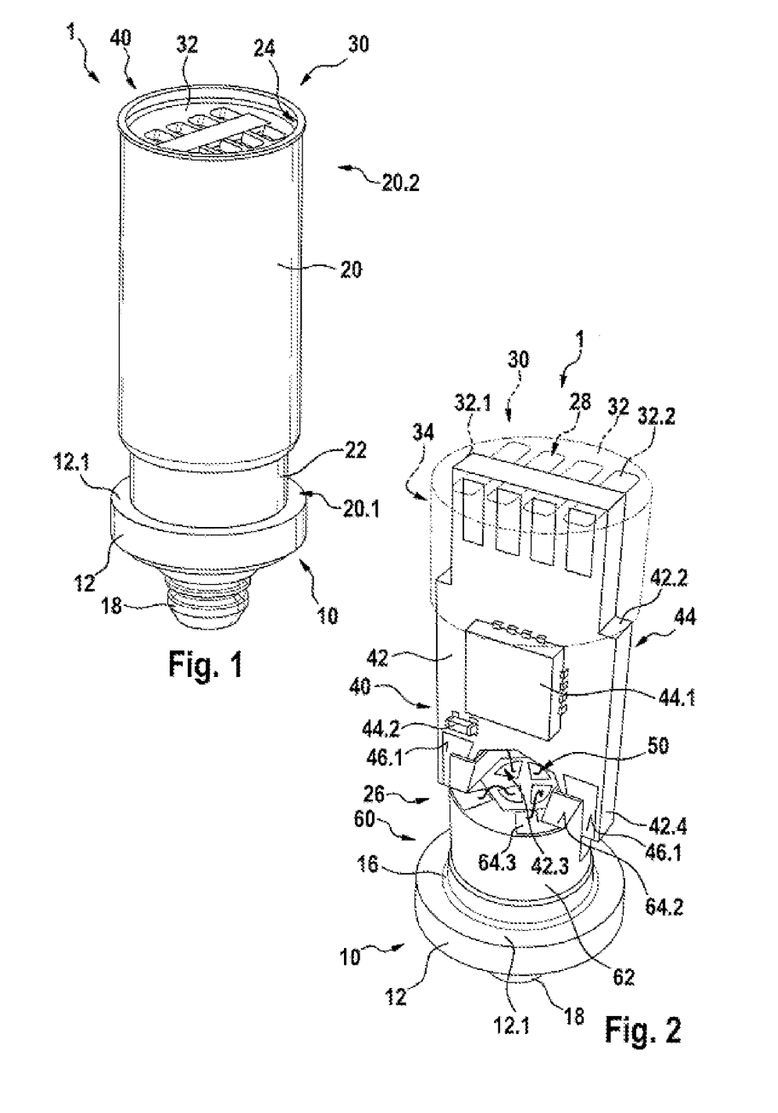
FIG. 1 shows a schematic perspective illustration of a sensor unit according to the disclosure.
FIG. 2 shows a schematic perspective illustration of a sensor unit according to the disclosure without a protective sleeve.

As also shown in FIGS. 1 and 2, the protective sleeve 20 is configured as a hollow cylinder and has a graduation 22 at the first end 20.1 in the illustrated exemplary embodiment. The protective sleeve 20 is joined at the graduated first end 20.1 to a sensor mount 10 which has a fastening flange 12 and a measuring connection 18 which is configured as a self-clinch connection in the illustrated exemplary embodiment of the sensor unit 1 as a pressure sensor unit. The fastening flange 12 has a flange edge 12.1 on which the protective sleeve 20 is supported and by means of which the sensor unit 1 can be caulked with a fluid block—not illustrated. In addition, the fastening flange 12 comprises a graduated flange surface 14, wherein the step 16 between the flange edge 12.1 and the flange surface 14 in the illustrated exemplary embodiment is used as a connecting region onto which the protective sleeve 20 is pressed. The protective sleeve 20 can additionally be welded to the fastening flange 12 at the transition of the step 16 in relation to the flange edge 12.1. The height of the graduation 22 or constriction of the protective sleeve 20 is selected such that it is possible to caulk the sensor unit 1 with the fluid block—not illustrated—above the flange edge 12.1 using a caulking tool. The fastening flange 12 of the sensor mount 10 can advantageously be configured with a smaller diameter by virtue of the stepped configuration at the lower first end 20.1 of the protective sleeve 20. However, as an alternative, the protective sleeve 20 can also be configured without a graduation 22.

As further shown in FIGS. 2 to 7, the main body 62 of the circuit mount 60 is configured as a cylinder with an inner joining geometry 62.2 which is matched to an outer contour 56 of the measuring cell 50 and surrounds the measuring cell 50 in the illustrated exemplary embodiment. The outer joining geometry 62.1 on the main body 62 of the circuit mount 60 comprises two receiving pockets which each comprise at least one first contact means 64.1 for making electrical contact with the printed circuit board 40. The at least one first contact means 64.1 is connected to at least one second contact means 64.3 for making electrical contact with the measuring cell 50 by means of an external conductor track 64.2 on the main body 62 of the circuit mount 60. The first joining geometry 42.3 of the printed circuit board 40 is configured as a cutout in the main mount 42, the said cutout being delimited on two opposite sides in each case by a guide limb 42.4. The two guide limbs 42.4 of the first joining geometry 42.3 of the printed circuit board 40 are each joined to a receiving pocket of the outer joining geometry 62.1 of the circuit mount 60. In the illustrated exemplary embodiment, the two guide limbs 42.4 of the printed circuit board 40 are guided into the receiving pockets 62.1 in the circuit mount 60 by means of inner guide edges 42.5. In addition or as an alternative, the guide limbs 42.4 of the printed circuit board 40 can also be guided on an inner contour 24 of the protective sleeve 20 by means of outer guide edges. The printed circuit board 40 can, if required, have a prespecifiable small angle of inclination in relation to the perpendicular vertical axis of the sensor unit 1 by virtue of corresponding shaping of the receiving pockets 62.1.

As further shown in FIGS. 2 to 7, the main mount 42 of the printed circuit board 40, which is positioned in a substantially perpendicular manner, has first contact means 46.1 in the region of the first joining geometry 42.3, the said first contact means forming the internal electrical interface 26 with corresponding first contact means 64.1 in the region of the outer joining geometry 62.1 on the main body 62 of the circuit mount 60. The main mount 42 of the printed circuit board 40, which is positioned in a substantially perpendicular manner, has second contact means 46.2 in the region of the second joining geometry 42.1, it being possible for corresponding external contact means 70—illustrated in FIG. 10—to make contact with the said second contact means and the said second contact means forming the external electrical interface 28.

As further shown in FIGS. 1 and 2, the main body 32 of the supporting unit 30 has a receiving opening 32.1 for the printed circuit board 40. The supporting unit 30 is inserted with play at the second end 20.2 of the protective sleeve 20 and is pushed onto the printed circuit board 40 by means of the receiving opening 32.1. The supporting unit 30 supports the printed circuit board 40 against an inner contour 23 of the protective sleeve 20 by means of an outer contour 34. In addition, the supporting unit 30 has guide means 32.2, which are configured as contact receiving pockets, for guiding the external contact means 70.

Figure 3:
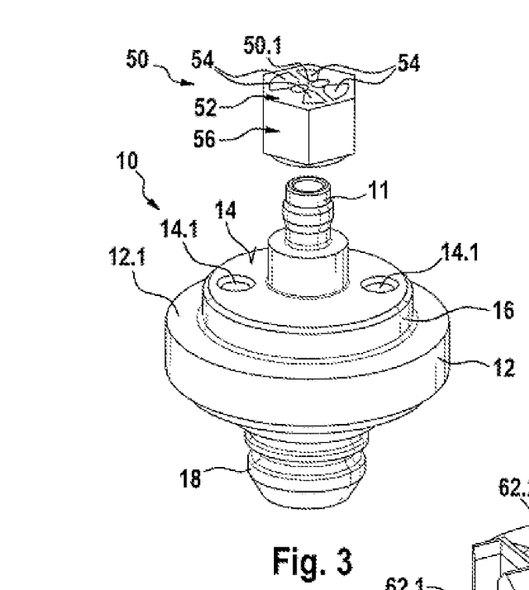
FIG. 3 shows a schematic perspective illustration of a sensor mount having a fastening flange and a measuring cell for the sensor unit according to the disclosure from FIG. 1 or 2 before the measuring cell is joined to the sensor mount.
Figure 4:
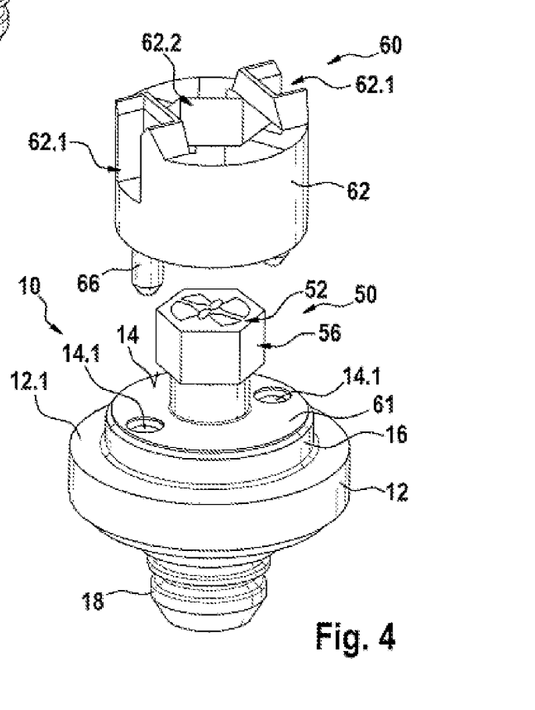
FIG. 4 shows a schematic perspective illustration of the sensor mount and a circuit mount for the sensor unit according to the disclosure from FIG. 1 or 2 before the circuit mount is joined to the sensor mount.
Figure 5:
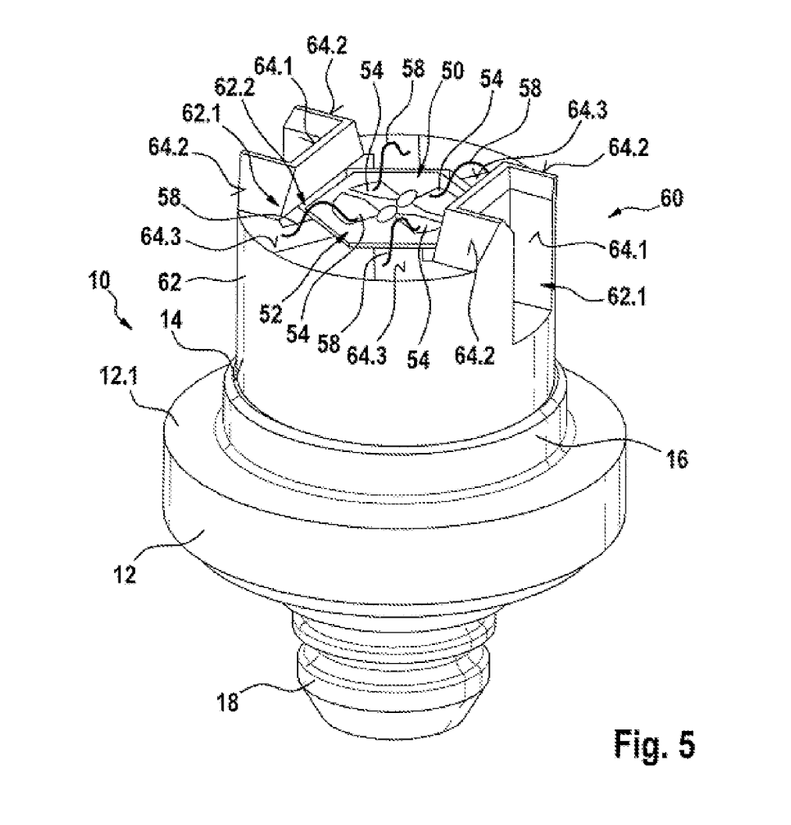
FIG. 5 shows a schematic perspective illustration of the sensor mount with the joined circuit mount for the sensor unit according to the disclosure from FIG. 1 or 2.

As further shown in FIGS. 3 to 5, the fastening flange 12 can be pressed or connected to the fluid block—not illustrated—by means of a self-clinch connection 18. In addition to the above-described connecting region 16 for pressing or welding the protective sleeve 20, connecting openings 14.1 are made in the flange surface 14, the said connecting openings receiving connecting pins 66, which are arranged on the circuit mount 60, in order to allow the circuit mount 60 to be connected to the sensor mount 10 in a rotationally fixed manner. In order to join the circuit mount 60 to the sensor mount 10, an adhesive layer 61 is applied to the flange surface 14 in the illustrated exemplary embodiment. It goes without saying that other suitable connecting techniques which are known to a person skilled in the art can also be used in order to join the circuit mount 60 to the sensor mount 10 in a rotationally fixed manner.

As further shown in FIGS. 3 to 5, the measuring cell 50, which is configured as a pressure measuring cell in the illustrated exemplary embodiment, is mounted on a tubular mount 11 of the fastening flange 12 such that a measuring diaphragm 50.1 of the measuring cell 50 is deformed as a function of the pressure of the fluid in the hydraulic block. The deformation of the measuring diaphragm 50.1 is detected by a measuring bridge 52. The measuring bridge 52 is connected to four contact points 54 which are electrically connected to the second contact means 64.3, which are configured as bonding areas, of the circuit mount 60 in each case by means of bonding wires 58 in the illustrated exemplary embodiment. The circuit mount 60 is preferably formed using what is known as MID-2K technology. The said circuit mount is produced as a plastic injection-molded circuit mount 60 using MID technology (Molded Interconnected Device), in particular using two-component injection molding. Three-dimensional circuit structures can be realized using MID technology. A plastic pre-molded part which is composed of a first plastic which can be electroplated is partially over-molded with a second plastic which cannot be electroplated. As an alternative, the second plastic which cannot be electroplated can also be at least partially over-molded with the first plastic which can be electroplated. The partially projecting surfaces of the pre-molded part are coated with a metal surface by an electroplating process, with the result that the external conductor tracks 64.2 and the first and second contact means 64.1, 64.2 are produced. The circuit mount 60 is distinguished, in particular, by a high degree of configuration freedom due to the integration of electrical and mechanical functions. As a result, the sensor unit 1 can be of particularly compact construction. In the illustrated exemplary embodiment, the circuit mount 60 comprises at least one plastic pre-molded part which is composed of a first plastic which can be electroplated and of a second plastic which cannot be electroplated. The second contact means 64.3, which are configured as bonding areas, are arranged on an end face of the circuit mount 60 and are connected to the corresponding first contact means 64.1, which are configured as contact areas and are arranged in the receiving pockets of the outer joining geometry 62.1, by means of external conductor tracks 64.2. The first contact means 64.1, the conductor tracks 64.2 and the second contact means 64.3 of the circuit mount 60 are each formed as a metal layer with prespecifiable dimensions and are applied to the plastic, which can be electroplated, of the circuit mount 60 in an electroplating process.

Figures 6, 7:
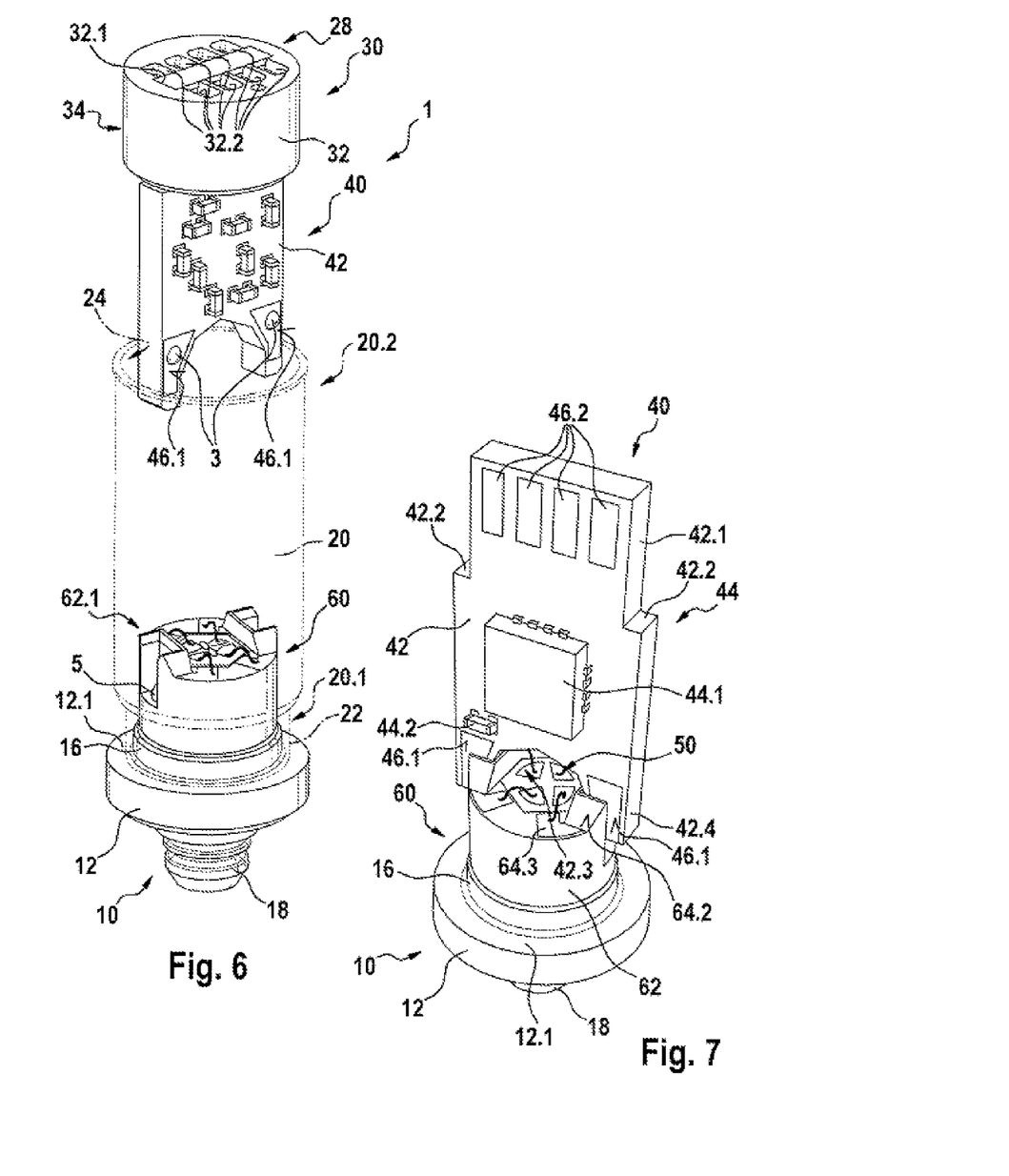
FIG. 6 shows a schematic perspective illustration of the sensor mount with a joined protective sleeve before the printed circuit board, which is joined to a supporting unit, for the sensor unit according to the disclosure from FIG. 1 or 2 is joined.
FIG. 7 shows a schematic perspective illustration of the sensor unit according to the disclosure from FIG. 1 or 2 after the printed circuit board is joined, without the supporting unit and without the protective sleeve.

The measuring cell 50 is welded to the sensor mount 10 during production of the sensor unit 1. The circuit mount 60 is then pressed into the connecting openings 14.1 by means of the connecting pins 66 and adhesively bonded, wherein the retaining adhesive layer 61 is introduced between the flange surface 14 and a main area of the circuit mount 60. As shown in FIG. 6, the protective sleeve 20 is pressed down and possibly fixed by way of a spot weld after the retaining adhesive layer 61 has hardened.

As further shown in FIGS. 6 and 7, the printed circuit board 40 is inserted into the receiving pockets in the outer joining geometry 62.1 on the main body 62 of the circuit mount 60 and optionally fixed there by retaining adhesive 5 and conductive adhesive 3 in order to ensure an electrically conductive connection between the circuit mount 60 and the printed circuit board 40 and to fix the printed circuit board 40. As further shown in FIG. 6, the retaining adhesive 5 is introduced at main areas of the receiving pockets 62.1 of the circuit mount 60 and the conductive adhesive 3 is applied to the first contact means 46.1, which are configured as contact areas, of the printed circuit board 40. The supporting unit 30 can be mounted onto the printed circuit board 40 before or after the printed circuit board 40 is joined. In addition, a mechanical and/or electrical connection between the printed circuit board 40 and the supporting unit 30 can optionally be established by means of conductive or retaining adhesive. In order to ensure a reliable electrical and mechanical connection between the printed circuit board 40 and the circuit mount 60 on the internal interface 26, the supporting unit 30 can be mounted onto the internal interface 26 before the conductive or retaining adhesive has hardened, in order to ensure force- and stress-free hardening of the conductive adhesive 3 and of the retaining adhesive 5 at the internal interface 26 by virtue of the printed circuit board 40 being supported on the inner contour 24 of the protective sleeve 20.

Figure 8:
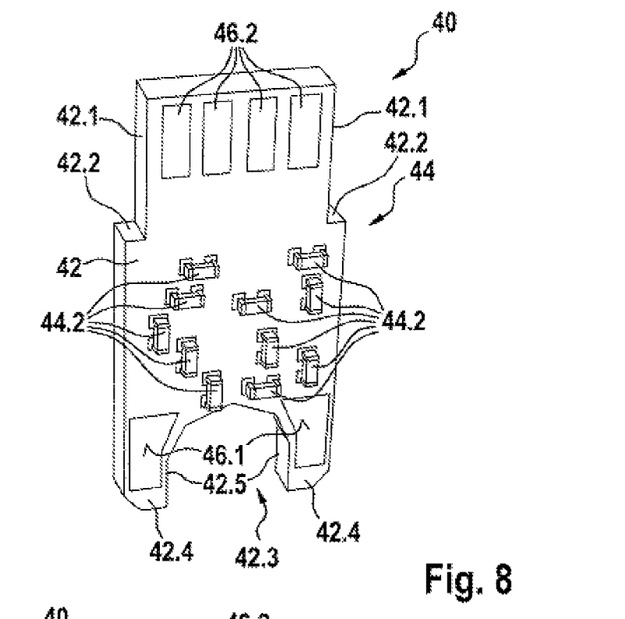
FIGS. 8 and 9 each show a schematic perspective illustration of a printed circuit board for the sensor unit according to the disclosure from FIG. 1 or 2.
Figure 9:
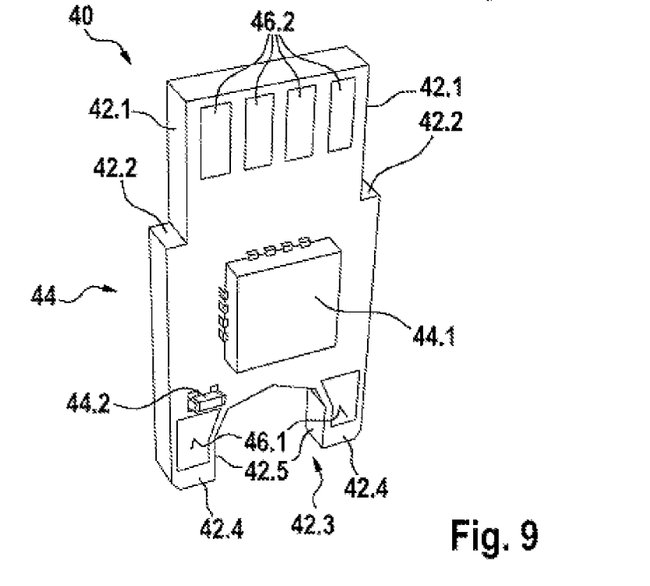
Figure 10:
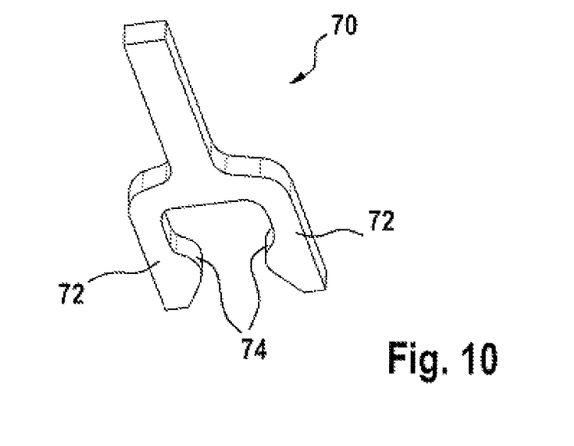
FIG. 10 shows a schematic perspective illustration of an external contact means for the sensor unit according to the disclosure from FIG. 1 or 2.
Figure 11:
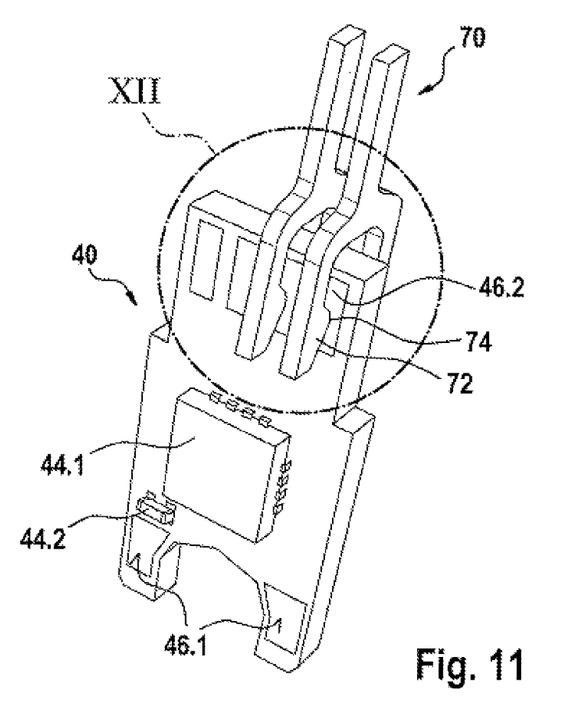
Figure 12:
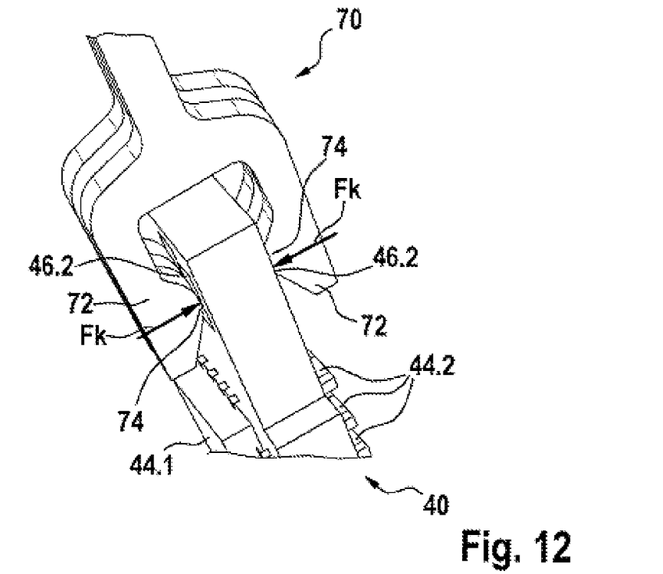
FIG. 12 shows a schematic illustration of a detail from FIG. 11 from a different viewing angle.
Figure 13:
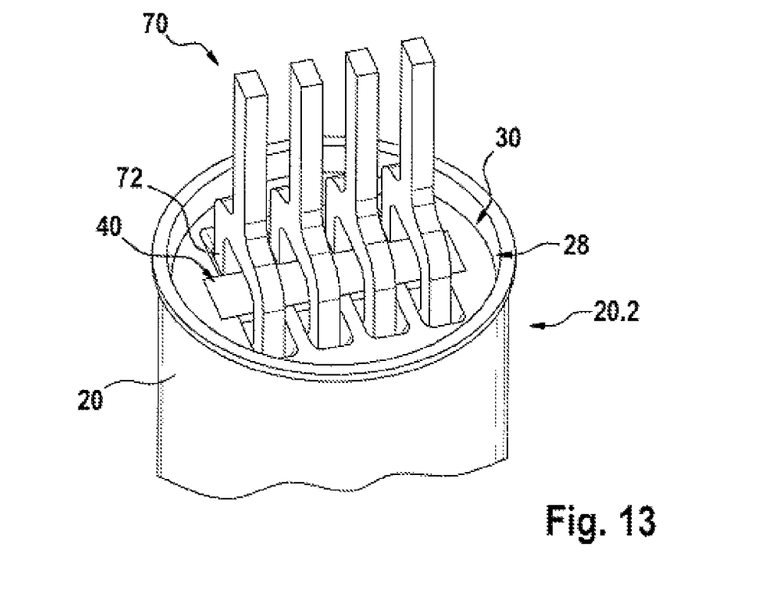

As is further shown in FIGS. 8 and 9, the printed circuit board 40 has the flat main mount 42 with first contact means 46.1, which are configured as contact areas, and second contact means 46.2, which are configured as redundant contact areas, the said contact means being arranged on both sides of the main mount 42. As is further shown in FIGS. 8 and 9, the main mount 42 of the printed circuit board 40 is configured to be relatively narrow in the region of the external interface 28 in order to form the second joining geometry 42.1 with a first guide edge, and has a stop shoulder 42.2 against which the supporting unit 30 rests when the second end face of the printed circuit board 40 is accommodated by the receiving opening 32.1 in the supporting unit 30 in order to guide the supporting unit 30 and to fix the said supporting unit on the printed circuit board 40. As an alternative, the stop can also be realized in the upper region of the supporting unit 30 by the depth of the receiving opening 32.1 in the supporting unit 30 for accommodating the second joining geometry 42.1 of the printed circuit board 40 being limited.

As further shown in FIGS. 8 and 9, the main mount 42 of the printed circuit board 40 has a fork shape having the two guide limbs 42.4 and two second guide edges 42.5, which delimit a cutout, in the region of the internal interface 26 for forming the first guide geometry 42.3. As has already been cited above, the guide limbs 42.4 of the printed circuit board 40 are additionally or alternatively also guided on the inner contour 24 of the protective sleeve 20 by means of outer guide edges. The fork shape of the first guide geometry 42.3 of the printed circuit board 40 is matched to the receiving pockets of the outer guide geometry 62.1 of the circuit mount 60, with the result that the main mount 42 of the printed circuit board 40 can be inserted into the circuit mount 60 and fixed. The printed circuit board 40 is populated on both sides and has at least two layers in the illustrated exemplary embodiment.

As further shown in FIGS. 10 to 13, the second contact means 46.2 of the printed circuit board 40 are configured in the illustrated exemplary embodiment as redundant contact areas which are in each case arranged on an upper face and a lower face of the main mount 42 of the printed circuit board 40. In addition, the external contact means 70 are configured in the illustrated exemplary embodiment as contact clips with two limbs 72 which are pushed onto the second contact means 46.2, which are configured as redundant contact areas, such that a contact force Fk acts perpendicular to the insertion direction of the main mount 42 of the printed circuit board 40. The external contact means 70, which are configured as elastic contact clips or contact forks, are geometrically shaped such that the external contact means 70 can be mounted onto the second contact means 46.2, which are configured as contact areas, of the printed circuit board 40 and can make contact with the said printed circuit board from both sides. By way of example, rounded insertion regions can therefore be provided on the external contact means 70. The respective contact regions 74 of the external contact means 70, which are configured as elastic contact clips or contact forks, are in this case located on the sides in the "fork tines" or "fork limbs" 72, so that the contact force Fk can be applied transverse to the inserted printed circuit board 40 and therefore the rest of the printed circuit board 40, in particular the internal interface, remains free of force. Since a greater contact force Fk is possible on account of this geometry, expensive contact materials such as gold can advantageously be dispensed with. The described sensor unit is particularly suitable for use as a pressure sensor in brake systems of motor vehicles, but is not restricted to this. A large number of pressure sensors are used when there is only a limited amount of installation space, in particular in premium-class brake systems. A pressure sensor unit which minimizes installation space is therefore suitable specifically for this application.

What is claimed is:

1. A sensor unit comprising:
   a protective sleeve;
   at least one measuring cell arranged in the protective sleeve and configured to detect a pressure of a hydraulic block; and
   a circuit mount arranged in the protective sleeve and having a printed circuit board positioned in a substantially perpendicular manner relative to the at least one measuring cell,
   wherein the printed circuit board includes an electronic circuit with at least one electronic and/or electrical component,
   wherein the at least one measuring cell has at least one connection point configured to tap off at least one electrical output signal from the at least one measuring cell,
   wherein the circuit mount has an internal interface configured to tap off the at least one electrical output signal from the measuring cell and to apply the at least one electrical output signal to the electronic circuit and has an external interface configured to tap off an output signal from the electronic circuit,
   wherein the internal interface is formed at a first end of the protective sleeve and the external interface is formed at a second end of the protective sleeve,
   wherein the printed circuit board comprises a main mount which has a first joining geometry on a first end face, the first joining geometry configured to be joined to an outer joining geometry on a main body of the circuit mount, and
   wherein the main mount of the printed circuit board has a second joining geometry on a second end face, the second joining geometry configured to be joined to a joining geometry on a main body of a supporting unit, the supporting unit being arranged at the second end of the protective sleeve and being configured to support the printed circuit board against the protective sleeve.

2. The sensor unit according to claim 1, wherein the main body of the circuit mount is configured as a cylinder having an internal joining geometry which is configured to match to an outer contour of the at least one measuring cell and to surround the at least one measuring cell.

3. The sensor unit according to claim 1, wherein:
   the outer joining geometry on the main body of the circuit mount includes two receiving pockets, and
   each receiving pocket includes at least one first contact mechanism configured to make electrical contact with the printed circuit board.

4. The sensor unit according to claim 3, wherein:
   the at least one first contact mechanism is connected to at least one second contact mechanism, and
   the at least one second contact mechanism is configured to make electrical contact with the at least one measuring cell via an external conductor track on the main body of the circuit mount.

5. The sensor unit according to claim 3, wherein:
   the first joining geometry of the printed circuit board is configured as a cutout in the main mount, the cutout being delimited by a guide limb on each of two opposite sides, and
   the two guide limbs of the first joining geometry of the printed circuit board are each joined to a corresponding receiving pocket of the outer joining geometry of the circuit mount.

6. The sensor unit according to claim 1, wherein:
   the main mount of the printed circuit board has a first contact mechanism in a region of the first joining geometry, and
   the first contact mechanism is configured to form the internal interface with a corresponding first contact mechanism in a region of the outer joining geometry on the main body of the circuit mount.

7. The sensor unit according to claim 1, wherein:
   the main mount of the printed circuit board has a second contact mechanism in a region of the second joining geometry, and
   the second contact mechanism is configured to make contact with a corresponding external contact mechanism to form the external interface.

8. The sensor unit according to claim 7, wherein the second contact mechanism is configured as redundant contact areas which are in each case arranged on an upper face and a lower face of the main mount of the printed circuit board.

9. The sensor unit according to claim 8, wherein the external contact mechanism is configured as contact clips with two limbs which are pushed onto the second contact mechanism such that a contact force acts perpendicular to an insertion direction of the main mount of the printed circuit board.

10. The sensor unit according to claim 7, wherein the supporting unit has a guide mechanism configured to guide the external contact mechanism.

* * * * *